United States Patent
Nama et al.

(10) Patent No.: US 8,958,834 B2
(45) Date of Patent: Feb. 17, 2015

(54) RESOURCE CONTROL IN A COMMUNICATION SYSTEM

(75) Inventors: Hithesh Nama, San Jose, CA (US); Amit P. Butala, Sunnyvale, CA (US); Shridhar M. Mishra, Belmont, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 645 days.

(21) Appl. No.: 13/283,530

(22) Filed: Oct. 27, 2011

(65) Prior Publication Data

US 2012/0115522 A1 May 10, 2012

Related U.S. Application Data

(60) Provisional application No. 61/411,425, filed on Nov. 8, 2010.

(51) Int. Cl.
*H04B 15/00* (2006.01)
*H04W 72/04* (2009.01)
*H04W 52/24* (2009.01)
*H04W 24/10* (2009.01)

(52) U.S. Cl.
CPC ........ *H04W 72/0473* (2013.01); *H04W 52/244* (2013.01); *H04W 24/10* (2013.01)
USPC ........ 455/501; 455/500; 455/517; 455/67.11; 455/509; 455/550.1; 370/328; 370/329; 370/338; 370/343; 370/252

(58) Field of Classification Search
CPC .......................... H04W 52/243; H04W 52/244
USPC .............. 455/501, 500, 517, 509, 507, 67.11, 455/515, 423–425, 426.1, 426.2, 445, 455/550.1, 422.1, 403; 370/328, 329, 338, 370/343, 252, 310
See application file for complete search history.

(56) References Cited

U.S. PATENT DOCUMENTS

| 2007/0105561 A1* | 5/2007 | Doetsch et al. ............... 455/450 |
| 2011/0128926 A1 | 6/2011 | Nama et al. |
| 2012/0026896 A1* | 2/2012 | Li et al. ......................... 370/248 |
| 2014/0092882 A1* | 4/2014 | Sankar et al. ................. 370/336 |

* cited by examiner

*Primary Examiner* — Keith Ferguson
(74) *Attorney, Agent, or Firm* — TechLaw LLP

(57) ABSTRACT

Methods, devices, and computer program products facilitate resource allocation to entities within a wireless communication network. Interference values are determined in the presence of entities that may or may not be controlled by the wireless communication network. Based on the determined interference values and associated statistics, throughputs associated with the user equipment within the wireless communication network are modified. These modifications enable an increase or decrease in the throughput of the user equipment, which optimizes the aggregate throughput of the wireless communication network while maintaining the interference levels within target levels.

40 Claims, 8 Drawing Sheets

RESOURCE CONTROL IN A COMMUNICATION SYSTEM

FIELD OF INVENTION

The present invention relates generally to the field of wireless communications. More particularly, the present invention relates to optimizing the performance of user equipment within a wireless communication network.

BACKGROUND

This section is intended to provide a background or context to the embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

High Speed Packet Access (HSPA) is a protocol used within Universal Mobile Telecommunication System (UMTS) and it comprises two mobile telephony protocols: High Speed Downlink Packet Access (HSDPA) and High Speed Uplink Packet Access (HSUPA). HSPDA and HSUPA extend and improve the performance of existing UMTS protocols by improving the capacity and throughput while reducing latency. In particular, HSUPA provides fast uplink packet switch data services with a shorter Transmission Time Interval (TTI) and Hybrid ARQ (HARQ) with incremental redundancy, which makes retransmissions more effective. In HSUPA, the Enhanced Dedicated Physical Data Channel (E-DPDCH) and the Enhanced Dedicated Physical Control Channel (E-DPCCH) are provided to carry the uplink packet data and the associated control information, respectively.

HSUPA also uses a packet scheduler that operates on a request-grant basis, where at any given time, a number of User Equipments (UEs) may request a permission to send data in the uplink direction. In requesting data transmissions, the UEs typically send information such as scheduling information messages that include information such as queue lengths, power headroom and the like. In response, the HSUPA scheduler allocates radio resources on the uplink to the requesting UEs. The amount of data that a UE can transmit depends on the transmit power grant allocated to that UE by the HSUPA scheduler. The higher the grant, the more data a UE can transmit. In order to ensure fidelity of uplink transmissions, it is important to keep the total interference or total received power, measured commonly as rise over thermal (RoT) noise floor, under tight control and equivalently to ensure RoT stability. While the HSUPA scheduler in a cell can exert control over the scheduling and power allocation for the HSUPA UEs that are served by this cell, the scheduler cannot control the transmissions of non-HSUPA UEs. For example, the HSUPA scheduler cannot control UEs that operate pursuant to UMTS Release 99 (R99) or the Release 5 (Rel 5) standard that are connected to the current cell. In fact, such UMTS R99/Rel-5 systems do not operate on a request-grant basis. Furthermore, the HSUPA scheduler cannot control other interfering UEs that are served by other cells.

SUMMARY

The disclosed embodiments relate to systems, methods, devices, and computer program products that facilitate resource allocation to various UEs in the presence of interference due to additional UEs that are not controlled by the current cell or network. The disclosed embodiments further maximize the total throughput of the current cell, as well as the current network, while maintaining RoT stability in the presence of additional uncontrolled interferers.

One aspect of the disclosed embodiments, relates to a method that includes estimating rise-over-thermal (RoT) values at a node in a wireless communication network in the presence of one or more interfering entities that are not controlled by the node in the wireless communication network. The method further includes producing a signal indicative of a modified throughput associated with transmissions of a user equipment controlled by the node in the wireless communication network in accordance with the estimated RoT values. In an embodiment, the signal is produced at each node in the wireless communication network. In one example, each node operates independently from other nodes in the wireless communication network, while in another example, at least one node operates collaboratively with at least one other node in the wireless communication network.

In another embodiment, the estimated RoT values are used to determine at least one RoT statistic. In this embodiment, the signal that is indicative of a modified throughput is produced if the at least one determined RoT statistic fails to conform to a corresponding target statistic. In still another embodiment, the one or more interfering entities that are not controlled by the node are selected from a group consisting of the following entities: a non-high-speed-uplink-data-access (non-HSUPA) entity, an entity that is controlled by a neighboring cell, an entity that is not controlled by an uplink scheduler of the node, and an entity that controlled by another wireless communication network.

According to another embodiment in which the above-noted at least one determined RoT statistic exceeds a target RoT level, the signal that is indicative of a modified throughput is indicative of a reduced throughput associated with transmissions of one or more user equipment controlled by the node. In another embodiment in which the at least one determined RoT statistic is below a target RoT level, the signal that is indicative of a modified throughput is indicative of an increased throughput associated with transmissions of one or more user equipment controlled by the node.

In another embodiment, a second determination of an RoT statistic is made after a particular period of time subsequent to the determination of the at least one RoT statistic. In this embodiment, the particular period of time is selected in accordance with parameters associated with the user equipment and/or the wireless communication network. For example, the parameters are selected from a group consisting of some or all of the following: a speed of decoding of the signal by the user equipment, a speed of effecting the modified throughput by the user equipment, a duration of information units associated with the wireless communication network, and a delay associated with the transmission of the signal.

According to one embodiment, the signal that is indicative of a modified throughput is transmitted to the user equipment, and a second determination of an RoT level is made substantially immediately after transmission of the signal. In yet another embodiment, the signal is indicative of a modified allocated power grant level associated with the user equipment.

In another embodiment, the user equipment is not connected to the wireless communication network, and the signal that is indicative of a modified throughput is transmitted to the user equipment once the user equipment is connected to the wireless communication network. In still another embodiment, the user equipment is connected to the wireless communication network, and the signal is transmitted to the user equipment.

According to one embodiment, the above-noted at least one determined RoT statistic is a short-term statistic. In another embodiment, the at least one determined RoT statistic is a long-term statistic, and a target RoT level associated with a short-term statistic is modified in accordance with the determined long-term statistic.

Another aspect of the disclosed embodiments relates to a device that comprises a processor, and a memory comprising processor executable code. The processor executable code, when executed by the processor, configures the device to estimate rise-over-thermal (RoT) values at a node in a wireless communication network in the presence of one or more interfering entities that are not controlled by the node in the wireless communication network. The processor executable code, when executed by the processor, also configures the device to produce a signal indicative of a modified throughput associated with transmissions of a user equipment controlled by the node in the wireless communication network in accordance with the estimated RoT values.

Another aspect of the disclosed embodiments relates to a computer program product, embodied on a non-transitory computer readable medium. The computer program product comprises program code for estimating rise-over-thermal (RoT) values at a node in a wireless communication network in the presence of one or more interfering entities that are not controlled by the node in the wireless communication network. The computer program product also comprises program code for producing a signal indicative of a modified throughput associated with transmissions of a user equipment controlled by the node in the wireless communication network in accordance with the estimated RoT values.

Another aspect of the disclosed embodiments relates to a method that comprises receiving a signal indicative of a modified throughput associated with transmissions of a user equipment controlled by a wireless communication network, where the signal having been produced by estimating rise-over-thermal (RoT) values at a node associated with the wireless communication network in the presence of one or more interfering entities that are not controlled by the node in the wireless communication network. The method further comprises effecting the modified throughput at the user equipment.

Another aspect of the disclosed embodiments relates to a device that includes a processor and a memory comprising processor executable code. The processor executable code, when executed by the processor, configures the device to receive a signal indicative of a modified throughput associated with transmissions of the device controlled by a wireless communication network, where the signal having been produced by estimating rise-over-thermal (RoT) values at a node associated with the wireless communication network in the presence of one or more interfering entities that are not controlled by the node in the wireless communication network. The processor executable code, when executed by the processor, further configures the device to effect the modified throughput at the device.

Another aspect of the disclosed embodiments relates to a computer program product, embodied on a non-transitory computer readable medium. The computer program product includes program code for receiving a signal indicative of a modified throughput associated with transmissions of a user equipment controlled by a wireless communication network, where the signal having been produced by estimating rise-over-thermal (RoT) values at a node associated with the wireless communication network in the presence of one or more interfering entities that are not controlled by the node in the wireless communication network. The computer program product also includes program code for effecting the modified throughput at the user equipment.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

Figure 1:
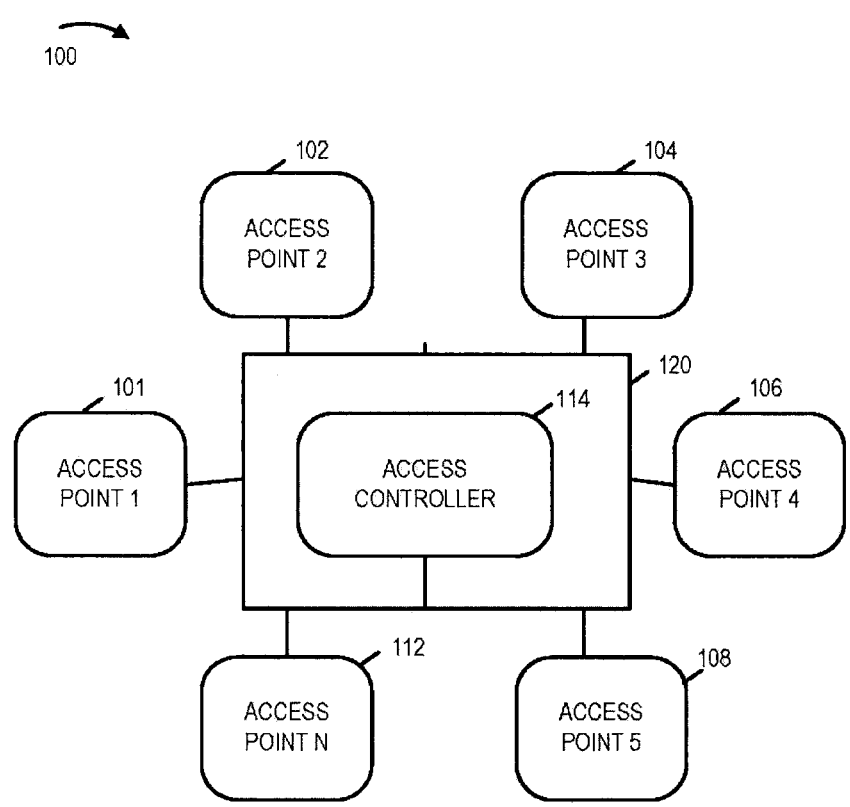
FIG. 1 illustrates an exemplary network within which the disclosed embodiments can be implemented.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. Moreover, certain embodiments are described herein with reference to the term user equipment. A user equipment can also be called a user terminal and can include some or all of the functionalities of a mobile station, a mobile wireless terminal, a mobile device, a wireless communication device and the like. It should also be noted that while certain disclosed embodiments are described using exemplary HSUPA systems, the disclosed embodiments are equally applicable to other networks and systems, such as GSM, EDGE, CDMA2000, LTE and the like.

The uplink transmissions in UMTS are power controlled through an inner loop power control (ILPC) mechanism. A UE is instructed by a cell to increase or decrease its transmit power such that the received signal-to-interference ratio (SIR) of its uplink pilot channel is close to a target SIR (e.g., 7 dB). A failure to carefully control the transmit powers of UEs in a cell can lead to RoT instability. For example, if the received SIR of a UE is below the target SIR due to strong interference from another UE, then the UE can be instructed to increase its transmit power by the ILPC mechanism. This increase could reduce the SIR for all other UEs in the cell, which would in turn increase their transmit powers, triggering a similar transmit power increase at the first UE. As the RoT at the cell is maintained below a certain threshold, this positive feedback is dampened and all UEs are able to converge to individual transmit power levels that satisfy their SIR targets. However, if the RoT at the cell is high, as a result of this positive feedback mechanism, all UEs can end up transmitting at their maximum power levels without meeting the requisite target SIR. This example scenario can lead to dropped calls and prevent other UEs from connecting to this cell.

As noted earlier, the HSUPA scheduler operating at each cell is responsible for allocation of uplink radio resources among HSUPA users connected to that cell while ensuring RoT stability. A typical RoT stability criterion is to maintain the RoT below a target level (e.g., 7 dB) for a certain percentage (e.g., 99%) of the time. In order to meet the requisite RoT criteria, the scheduler must account for the interference from all entities within and in the vicinity of the cell, including interfering UEs that are not connected to the current cell (e.g., UEs is the neighboring cells), non-HSUPA UEs, UEs that can only be slowly controlled (e.g., non-served HSUPA UEs) and/or other interfering entities outside of the control of the current cell. To simplify the nomenclature, all entities that can potentially contribute to the RoT of a given cell but are not controlled by the HSUPA scheduler in that cell are referred to as "uncontrolled" entities or "entities that are not controlled by the cell." It should be noted that, in some embodiments (e.g., in soft handoff situations), an user equipment may still be considered an uncontrolled entity if it is not controlled by the cell's scheduler, even if the user equipment is still connected to that cell. The disclosed embodiments facilitate power allocation and maintenance of RoT stability at a given cell in the presence of such uncontrolled entities, while maximizing the cell throughput.

FIG. 1 illustrates an exemplary system 100 which may be used to accommodate some or all of the disclosed embodiments. The system 100 can, for example, be a self-configuring enterprise network. The system 100 includes a plurality of access points referenced as 101, 102, 104, 106, 108 and 112. The access points that are illustrated in FIG. 1 are connected, directly or indirectly, to an access controller 114 through connection 120. Each of the access points 101, 102, 104, 106, 108 and 112 is herein referred to as an "internal access point" (or an "internal radio node"). Each internal access point may communicate with a plurality of UEs, as well as other access points.

It should be noted that while FIG. 1 illustrates a single central controller 114 that is distinct from the access points, it is also possible that the access controller is implemented as part of one or more access points. Further, the various embodiments of the present invention may also be implemented using a peer-to-peer network of access points, where each access point can initiate certain transmissions, including commands and/or data, to other access points without the involvement of a central controller. It should be also noted that throughout this disclosure, the terms access point, base station, radio node, cell, Node B and eNode B may be used interchangeably to refer to the same entity within a wireless communication network.

The exemplary block diagram that is shown in FIG. 1 is representative of a single network that may be adjacent to, or partially overlapping with, other networks. The collection of these other networks, which may comprise macro-cellular networks, femtocell networks and the like, are herein referred to as the external networks. Each "external network" may comprise one or more access controllers and a plurality of "external access points" (or "external radio nodes").

Figure 2:
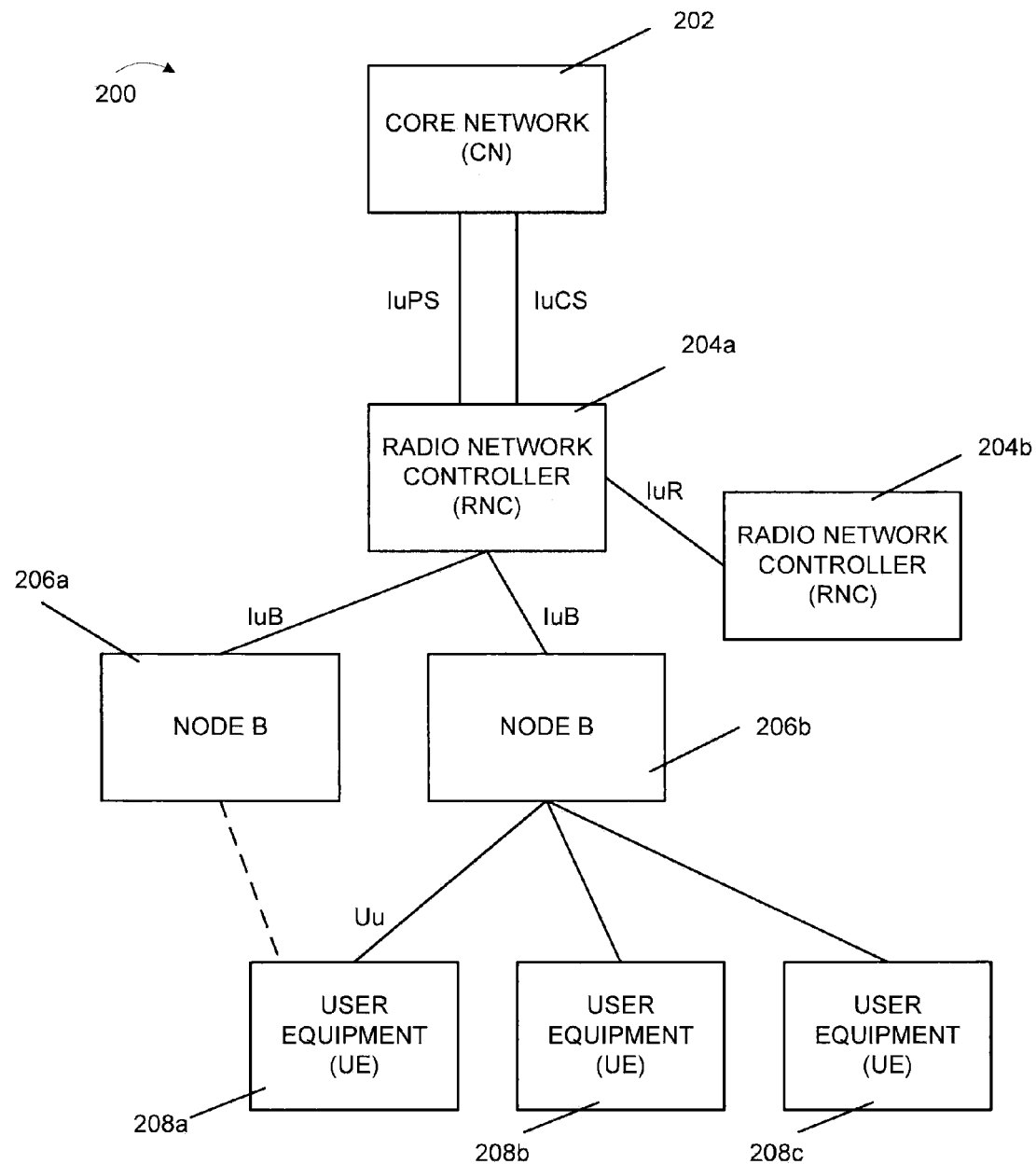
FIG. 2 illustrates an exemplary network within which the disclosed embodiments can be implemented.

FIG. 2 is another exemplary diagram of a radio network 200, such as a Universal Mobile Telecommunication System (UMTS) Terrestrial Radio Access Network (UTRAN), that can accommodate the various disclosed embodiments. The network that is depicted in FIG. 2 comprises a Core Network (CN) 202, one or more Radio Network Controllers (RNC) 204a that are in communication with a plurality of Node Bs 206a and 206b (or base stations or radio nodes) and other RNCs 204b. Each Node B 206a, 206b is in communication with one or more UEs 208a, 208b and 208c. There is one serving cell controlling the serving radio link assigned to each UE 208a, 208b and 208c. However, as illustrated in FIG. 2 with a dashed line, a UE 208a may be in communication with more than one Node B. For example, a Node B of a neighboring cell may communicate with one or more UEs of the current cell during handoffs and/or to provide overload indications. While FIG. 2 depicts an exemplary UMTS radio network, the disclosed embodiments may be extended to operate with other systems and networks such as CDMA2000, WiMAX, LTE and the like.

Figure 3:
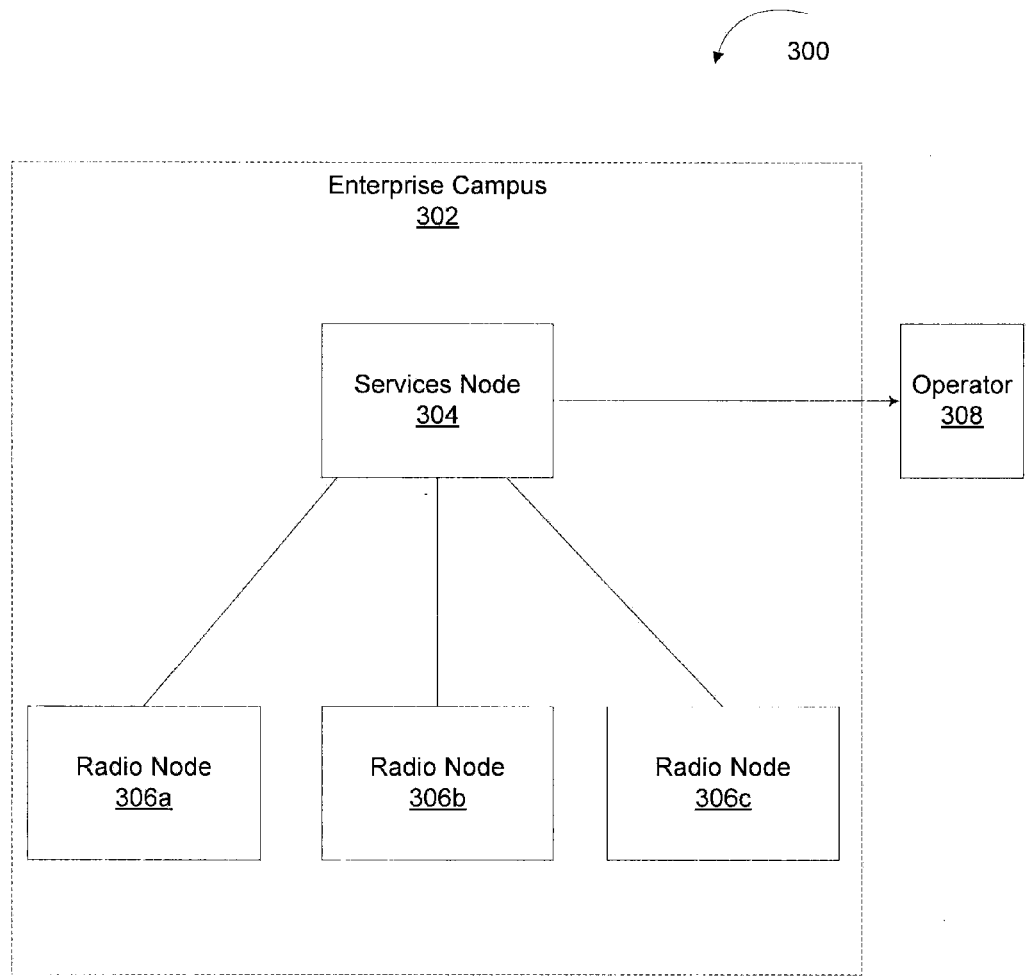
FIG. 3 illustrates an exemplary network within which the disclosed embodiments can be implemented.

FIG. 3 illustrates an exemplary Enterprise Radio Access Network (E-RAN) 300 that can be used to accommodate the various disclosed embodiments. The E-RAN 300 includes a services node 304 and a plurality of radio nodes 306a, 306b and 306c. It should be noted that the E-RAN 300 can include fewer or additional radio nodes and/or additional services nodes. The services node 304 is the central control point of the overall cluster of radio nodes 306a, 306b and 306c that are deployed throughout the enterprise campus 302. The services node 304, which can be deployed inside the enterprise local area network (LAN) provides, for example, session management for all mobile sessions delivered by the radio nodes 306a, 306b and 306c. Each of the radio nodes 306a, 306b and 306c are in communication with one or more UEs (not depicted). The radio nodes 306a, 306b and 306c can support a multi-radio architecture that allows a flexible upgrade path to higher user counts, as well as the ability to support different radio access technologies. In one example, the E-RAN 300 configuration allows the creation of a unified mobile corporate network that integrates mobile workers distributed throughout the overall enterprise domain with centrally located corporate assets. FIG. 3 also illustrates an operator 308 that is in communication with the services node 304, which can monitor the operations of the services node 304 and can provide various input and control parameters to the services node 304. For example, the operator 308 can setup configuration space parameters for the enterprise campus 302. The interactivity between the operator 308 and the services node 304 can be provided through, for example, a command line interface (CLI) and/or industry-standard device configuration protocols, such as TR-69 or TR-196. It should be noted that while the exemplary diagram of FIG. 3 illustrates an operator 308 that is outside of the enterprise campus 302, in some embodiments, the operator 308 can reside within the enterprise campus 302. Similarly, the services node 304 can reside outside the enterprise campus 302.

The exemplary radio networks that are depicted in FIGS. 1-3 all include a central controller. However, the disclosed embodiments are equally applicable to non-centralized network architectures. Such architectures can, for example, comprise isolated home Node Bs, radio nodes and/or a femtocell-based enterprise deployments that do not use a central controller.

Figure 4:
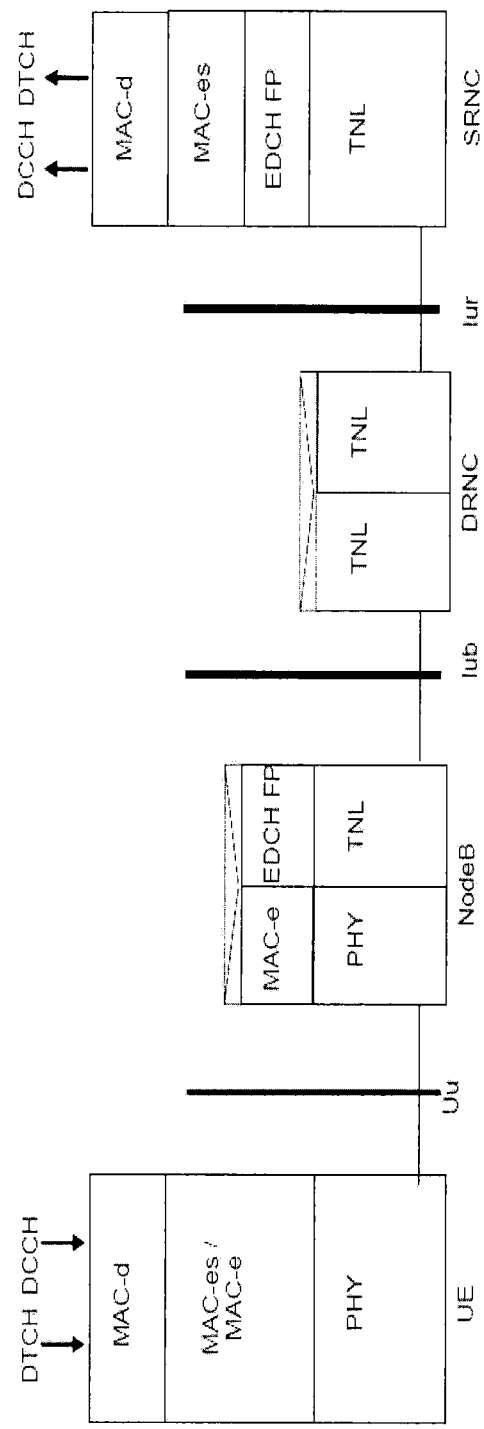
FIG. 4 illustrates a protocol architecture for use with an example embodiment.

FIG. 4 illustrates a protocol architecture that reflects the HSUPA-related functionalities that can be implemented in accordance with the disclosed embodiments. The Medium Access Control (MAC) entity (MAC-es/MAC-e) at the UE handles HARQ retransmissions, scheduling and MAC-e multiplexing, and E-DCH TFC selection. The MAC entity at the Node-B (MAC-e) handles HARQ retransmissions, scheduling, and MAC-e demultiplexing. The MAC entity (MAC-es) at the Serving RNC (SRNC) provides in-sequence delivery (reordering) and handles combining of data from different Node-Bs in case of soft handover. The HSUPA scheduler is located at the Node B and is responsible for controlling the uplink resources that are allocated to UEs in the cell.

An important aspect of providing enhanced uplink services is fine-grained uplink power allocation per-TTI basis. This is done by adjusting the Serving Grant (SG) for each UE in every TTI. The serving grant is an internal state variable in a UE and is the maximum permissible E-DPDCH-to-DPCCH power ratio. The serving grants are allocated in response to scheduling requests sent from the UEs. There are two control mechanisms that are delivered through specific downlink control channels to adjust the serving grant—the Absolute Grant Channel (AGCH) and the Relative Grant Channel (RGCH). The AGCH is a shared downlink channel and may be used to address a specific UE or a group of UE's through the use of an Enhanced Radio Network Temporary Identity (E-RNTI). A cell may use the AGCH to control UEs for which it is the serving cell. The RGCH is a dedicated physical downlink channel, and as such, may be used to individually target UEs. The RGCH may be used to control UEs served by the current cell, as well as UEs served by neighboring cells. In the latter scenario, the RGCH simply serves as an 'overload' indicator to request non-served (ns) UEs to power down. The use of AGCH and RGCH to achieve a robust scheduling strategy that also results in high system capacity is an extremely complex operation.

It is worth noting that UEs may be allowed to transmit certain types of information without formally requesting a scheduling grant. These include the transmission of scheduling information messages, signaling messages, and low latency traffic such as voice-over IP (VOIP). The non-scheduled transmissions can be restricted to certain HARQ processes by the NodeB HSUPA scheduler. In particular, such HARQ transmissions can include a positive acknowledgment (ACK) or a negative acknowledgment (NACK) to trigger the retransmission of data blocks that were not successfully received.

For scheduled transmissions, the HSUPA scheduler is made aware of queue states at the requesting UEs through scheduling requests, which can take two forms: (a) the "Happy Bit," which is communicated through the E-DPCCH and (b) the "Scheduling Information" messages, which are sent on the E-DPDCH.

The Happy bit provides an indication as to whether or not the UE is happy with its current Serving Grant. The definition of Happy, for a UE on an HSUPA call is whether it can empty its buffers within the Happy Bit Delay Condition period using the Serving Grant. A UE on an HSUPA considers itself "unhappy" if it is using its entire serving grant and if it has enough power to transmit a bigger mac-e transport block and if at the current rate it cannot empty its buffers within the happy bit delay condition period.

A Scheduling Information message comprises 4 parts: (1) Highest priority Logical channel ID (HLID), which unambiguously identifies the highest priority logical channel with available data; (2) Total E-DCH Buffer Status (TEBS), which identifies the total amount of data available across all logical channels for which reporting has been requested by the RRC and indicates the amount of data in number of bytes that is available for transmission and retransmission in RLC layer; (3) Highest priority Logical channel Buffer Status (HLBS), which indicates the amount of data available from the logical channel identified by HUD; and (4) UE Power Headroom (UPH), which indicates the ratio of the maximum UE transmission power and the corresponding DPCCH code power.

The primary task of the scheduler is to optimize the per-cell throughput while managing the link latency from each UE and the total rise-over-thermal (RoT) at a cell. The RoT is indicative of ratio of the total power received from UEs at a Node B in a cell to the thermal noise. The RoT may be characterized by Equation (1):

$$RoT_{Total} = RoT_{R99} + RoT_{ServingHSUPA} + RoT_{NonServingHSUPA} + RoT_{External} \quad (1)$$

where, $RoT_{Total}$ represents the total RoT measured at the receive antenna, $RoT_{R99}$ represents the RoT than can be attributed to non-HSUPA transmissions from other users that are known to the cell (e.g., R99, voice, and Rel. 5 users), $RoT_{ServingHSUPA}$ represents the RoT from users that are served by the cell, $RoT_{NonServingHSUPA}$ is the RoT from users that are decodable by the cell but are not served by it, and $RoT_{External}$ is any unaccounted RoT that are attributed to other UEs in the network that are not known to the cell. As noted earlier, the term uncontrolled UE may be used to refer to all UEs that are not controlled by the HSUPA scheduler in a cell. As such, in the context of Equation (1), all RoTs, on the right-hand side of Equation (1), other than the $RoT_{ServingHSUPA}$ can be attributed to uncontrolled UEs. It should be noted that Equation (1) represents the RoT in linear scale (i.e., the RoT's are not in decibels). Of the four quantities that are present on the right-hand side of Equation (1), only the $RoT_{ServingHSUPA}$ and $RoT_{NonServingHSUPA}$ can be influenced by the HSUPA scheduler. This control is exerted when the scheduler signals the serving grant to the served and non-served UEs over the common HSUPA downlink channels. However, as noted earlier, the remaining contributors to RoT levels must also be taken into account when transmit power allocations are made.

One approach to mitigate the interference from non-HSUPA users (e.g., R99, voice, and Rel 5 users) connected to a cell is to statically reduce the grant allocated to HSUPA users in proportion to the number of non-HSUPA users. However, this approach, which uses a pre-computed constant back-off, can result in significant reduction in cell throughput when the non-HSUPA users only have intermittent traffic. Further, such a constant reduction in allocated grants may not be sufficient if some of the interference is due to users that are not known to the cell (e.g., when a user is in the vicinity of a cell but is not connected to the cell). In addition, the RoT has a probabilistic distribution due to the presence and interaction of various airlink mechanisms, such as power control loops, estimation errors, fading, link imbalance, and the like. Therefore, if the RoT is too high for even a brief instant, the ILPC by itself may not have the ability to maintain the RoT within the operational range.

According to some of the disclosed embodiments, instead of applying a constant grant reduction, the scheduler dynamically changes the grants associated with one or more UEs in response to measured RoT levels. The understanding of the features associated with the disclosed techniques may be facilitated by considering an exemplary HSUPA scheduling method that is described in U.S. application Ser. No. 12/953,330, titled "METHOD, SYSTEM AND DEVICE FOR HIGH SPEED UPLINK PACKET ACCESS SCHEDULING," filed on Nov. 23, 2010, and assigned to the present assignee. In this exemplary scheduling method, the HSUPA scheduler is configured to use a time division multiplex (TDM) procedure to grant data transmission requests of the UEs. In particular, a single user is given a high grant, a programmable number of UEs are provided with a minimum-grant, while all other UEs get a zero grant. The high grant results in a high throughput and may be cycled through all UEs with large data buffers. The nominal value of the high grant is chosen such that transmissions of HSUPA users result in an RoT close to the target RoT level (e.g., 7 dB). However, the nominal RoT grant is determined based on the assumption that no uncontrolled entities (e.g., non-HSUPA UEs) are present.

Before grant allocation, the total receive power in each subframe (e.g., 2 ms interval) is measured and reported to the scheduler. For example, such a measurement can be conducted using the automatic gain control (AGC) module that is located at the receiver front end. The scheduler is also aware of the noise floor associated with the measured power levels. For instance, noise floor values may comprise pre-stored calibrated values that are available to the scheduler. Based on the received power measurements and the noise floor values, the RoT for each subframe can be computed. For example, the RoT (in decibels) can be computed as the difference between the measured receive power and the noise floor. In some embodiments, the subframe RoT values may be further processed to reduce false alarms and transient RoT spikes, as well as temporary RoT fluctuations which may be self-recovered without a need for scheduler intervention. For example, the computed RoT values may be averaged over a number of subframes (e.g., 3 subframes). In other examples, the RoT values may be median filtered over a number of subframes to remove transient values of a certain duration. In other examples, the RoT values may be high-pass filtered.

Figure 5:
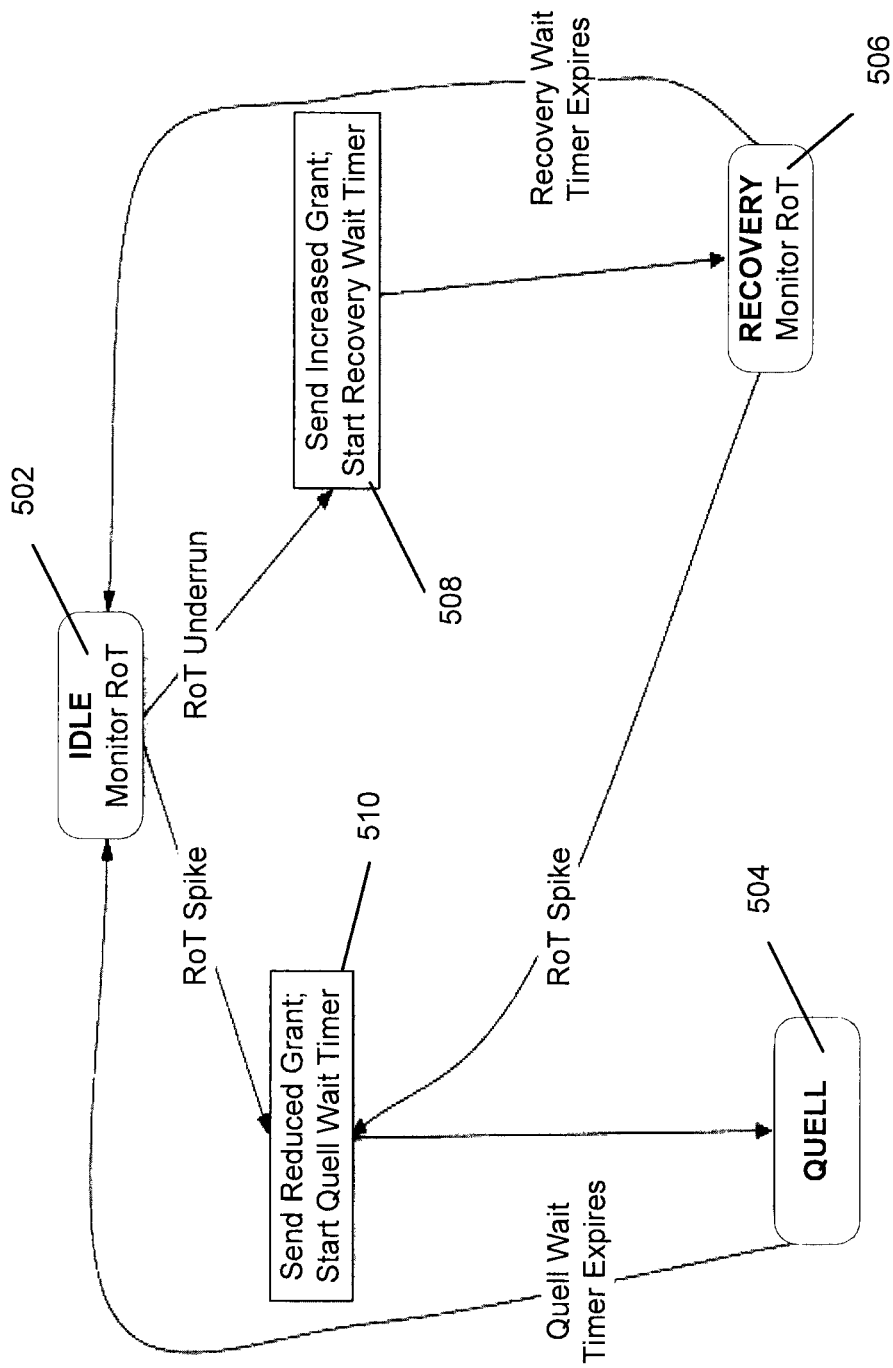
FIG. 5 is a state diagram illustrating operations that are conducted for providing power grant control in accordance with an example embodiment.

In accordance with the disclosed embodiments, the measured RoT values can be used to dynamically modify one or more grant levels associated with one or more UEs within the cell. For instance, in the above-described example, where a single high grant is allocated in a TDM-like fashion, the high grant level may be dynamically modified to maintain the RoT within the target range. FIG. 5 is a state diagram that illustrates dynamic power allocation according to an example embodiment. FIG. 5 includes three states: Idle 502 state, Quell 504 state and Recovery 506 state. In the Idle 502 state, the RoT is monitored to detect RoT spikes and/or RoT underruns. Upon detection of an RoT Spike, the scheduler sends a reduced grant signal to the UE that indicates a lower grant allocation level (see reference 510 in FIG. 5). In one example, the signaling of the reduced grant is not triggered unless the detected RoT exceeds the target RoT by a fixed offset value. The reduction of the grant allocation can be made proportional to the excess detected RoT above the target RoT value. In other embodiments, the grant value may be reduced by a fixed value (e.g., 3 dB) below a previously allocated grant to that UE. In addition, the modified grant can be constrained not to fall below a minimum value. In particular, in the above-described example where a single high-grant UE and multiple minimum-grant UE are allocated, the lower bound of grant reduction can be limited to the minimum-grant value. The allocation of a reduced grant is intended to reduce the transmit power associated with the particular UE, thus reducing the primary source of uplink interference in the cell. As a result, all users in the cell experience less interference and the ILPC mechanism, in turn, is able to reduce the transmit powers associated with other UEs. The overall effect is a reduction in the RoT level in this cell while maximizing cell throughput.

Upon signaling the reduced grant, the scheduler also starts a quell wait timer (see reference 510 in FIG. 5). The process then continues to the Quell 504 state. Since there is a non-negligible delay associated with the signaling of the grant reduction, as well as the application of the modified grant at the UE and stabilization of the RoT upon application of the grant, the process remains at the Quell 504 state until the quell wait timer has expired. In one example, the duration of the quell wait timer can be a fixed pre-determined value that allows sufficient time for the signaling and application of the modified grant value and/or stabilization of the RoT levels. In another example, the quell wait timer duration can be set to an initial value and subsequently updated to account for changes in network configuration and other system parameters. RoT spikes are more effectively mitigated if the quell wait timer duration is minimized. However, if the quell wait timer duration is too short, it is likely that the next RoT measurement is executed before the RoT levels have stabilized. As a result, another RoT spike may be reported and a second unnecessary Quell operation may be triggered. To mitigate these problems, in some embodiments, the quell wait timer duration is optimized based on system-wide parameters and UE-specific capabilities. For instance, the quell wait timer can be optimized based on how quickly a particular UE can decode and implement the reduced grant signals for uplink transmissions. In other examples, the quell wait timer duration can be selected based on the appropriate AGCH timing (e.g., based on 2 ms versus 10 ms TTIs, and UE tau-DPCH to account for transmit times associated with grant signaling. In one particular example, the wait timer duration values of 16 ms and 40 ms are selected for systems that utilized 2 ms and 10 ms TTIs, respectively. It should be noted that tau-DPCH is the time offset of the uplink dedicated physical channel of a UE from the common downlink pilot channel. Different UEs may have different tau-DPCH offsets in order to ease the processing burden associated with decoding multiple time-aligned physical channels on the uplink. The tau-DPCH values can be used to interpret when a new grant will be applied by the UE for future HSUPA uplink transmissions.

Referring back to FIG. 5, if while in the Idle 502 state, an RoT underrun is detected, the UE with a high grant is signaled with an increased grant value (see reference 508 in FIG. 5). An RoT underrun can occur if the measured RoT falls below a predefined target RoT (e.g., 7 dB) level. RoT underrun detection can also take into account high grant schedule history and other transmitted information (e.g,. ETFCI, Happy Bit, etc.). These considerations may allow the scheduler to ignore underruns that are caused by current low power transmissions occurring during the high grant transition times and/or when a UE is sending low power transmissions due to insufficient data. In one example, the increased grant can be a fixed value (e.g., 1 dB) above the previous grant value associated with that UE. In another example, the increased grant value can be higher than the previous grant value in proportion to the RoT underrun (i.e., the unused RoT). In addition, the modified grant can be constrained not to exceed a maximum value. In particular, in the above-described example where a single high grant UE and multiple minimum-grant UE are allocated in a TDM-like fashion, the upper bound of grant increase can coincide with the nominal high grant value.

Upon signaling the increased grant, a recovery wait timer is started (see reference 508 in FIG. 5). The process then continues to the Recovery 506 state and remains there until the recovery wait timer has expired and/or until an RoT spike is detected. In determining the duration of the recovery wait timer, similar considerations as the ones discussed in connection with the quell wait timer may be taken into account. In one embodiment, the quell wait timer and the recovery wait timer have identical durations. Upon expiration of the recovery wait timer, the process returns to the Idle 502 state to continue monitoring the RoT values. While in the Recovery 506 state, however, the process still continues to monitor the RoT values in order to quickly detect potential RoT spikes that may have been caused due to the application of the higher grant value or due to other sources of interference.

The exemplary state diagram that is depicted in FIG. 5 uses the RoT measurements that are conducted on an on-going basis, while in the Idle 502 state, to detect an RoT underrun. However, additional or alternate system parameters may be used to further assess the RoT values. For example, the RoT assessment can be tightly coupled to the loading information available in the cell. More specifically, a change in the RoT values can be observed based on transmission data rates of the UEs before and/or after the application of the modified grant. Monitoring transmission rates can further identify UEs that are not fully utilizing their grant levels. For example, an adjacent cell may be preventing an interfering UE from using its maximum allotted grant (e.g., in an ns-RGCH application). In another example, a UE may not have enough data to fully utilize its grant rate. In these and other examples, where a UE is not utilizing its full transmit capability, the detection of an RoT underrun, when combined with monitoring of the transmission rates, would not trigger an increase of the grant level since such an increase is not likely to improve the UEs transmission capacity.

It should be noted that, in order to facilitate the understanding of the underlying concepts, some of the above-noted example embodiments have been described in the context of a grant rate modification as applied to a single UE. However, it is understood that, pursuant to the disclosed embodiments, allocation of resources other than power grant levels (such as frequency, time, etc.) can also be increased or decreased to affect the RoT levels and/or cell throughput. Further, in an alternate embodiment, the total grant across a collection of UEs can be modified. In this alternate embodiment, the grants associated with two or more UEs can be reduced or increased through the use of, for example, AGCH and RGCH.

Figure 6:
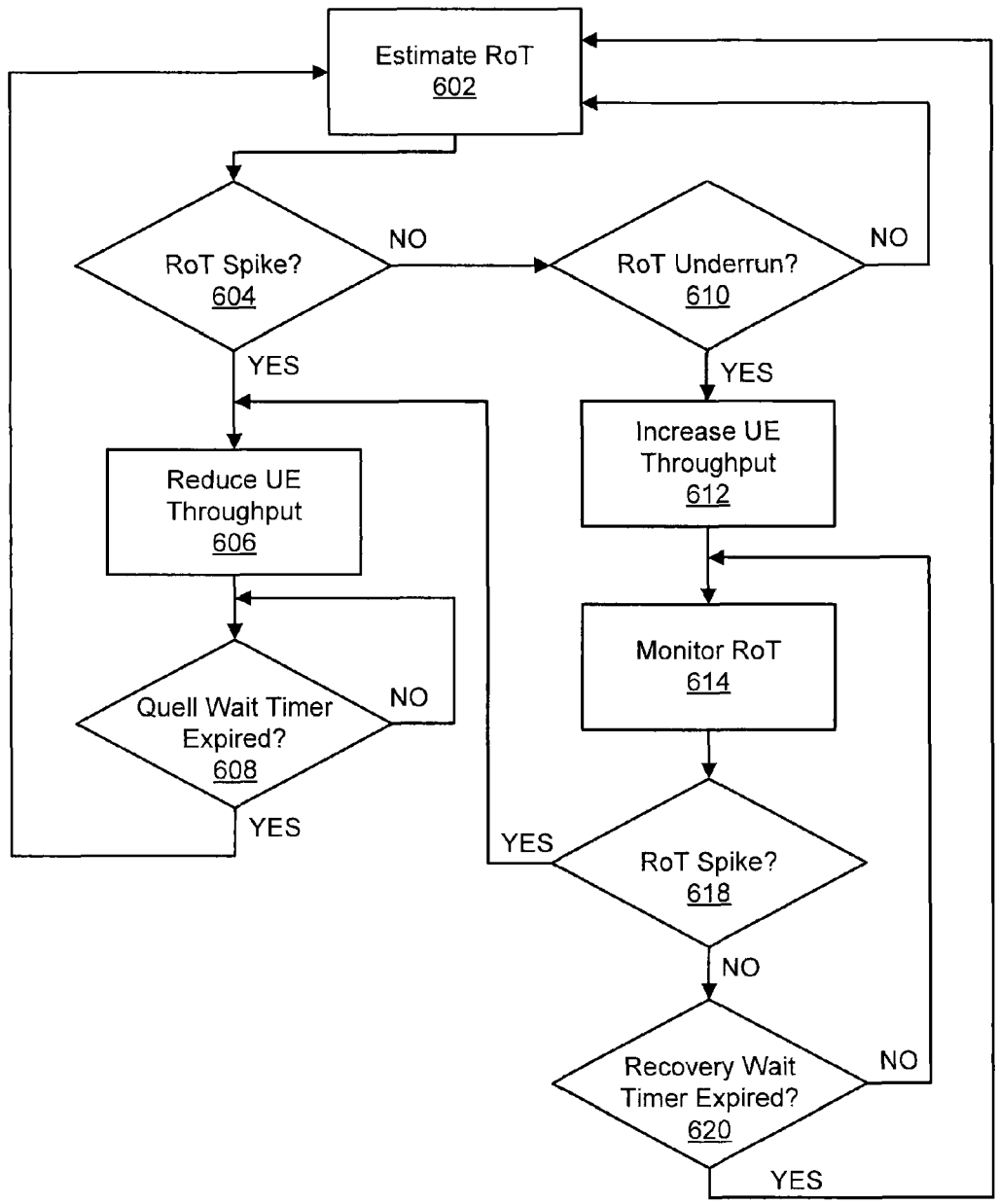
FIG. 6 is a block diagram illustrating operations that are conducted for providing resource grant control in accordance with an example embodiment.

FIG. 6 illustrates the operations that are carried out to effect resource grant control in accordance with an example embodiment. In step 602, an RoT value is estimated in order to detect the presence of an RoT spike or underrun. As discussed earlier, estimation of the RoT values may be based on measured RoT values, data rates associated with particular user equipment and other parameters. Further, one or more estimated RoT values may be combined to produce an RoT statistic, For example, several RoT measurements may be averaged to produce a short-term average RoT statistic. In step 604, it is determined if an RoT spike is present. If an RoT spike is not present, the process continues to step 610, where it is determined if an RoT underrun has occurred. If no RoT underrun is detected, the process returns to step 602 to continue estimating the RoT values/statistics based on incoming measurements, data rates and the like. It should be noted that while the block diagram of FIG. 6 shows a particular sequence associated with steps 604 and 610, the ordering of these steps, in some embodiments, may be reversed. Alternatively, steps 604 and 610 can be carried out simultaneously.

If an RoT spike is detected at 604, the process continues to step 606, where the throughput of one or more the user equipment is reduced. As noted earlier, such a reduction in throughput can be effected by, for example, reducing the grant level associated with one or more UEs. At the same time as, or shortly after, signaling a reduction in throughput, a quell wait timer is initiated. In step 608, it is determined if the quell wait timer has expired. Once the quell wait timer expires, the process returns to step 602, where RoT levels based on incoming measurements, data rates and the like are estimated.

If, in step 610, an RoT underrun is detected, an increase is UE throughput is signaled in step 612. As noted earlier, such an increase in throughput can be effected by, for example, increasing the grant value associated with one or more UEs. However, such an increase may be limited by the maximum allowable value of the grant value, the maximum stepwise increase in the grant value, the ability of the UE to use an increased grant value, and the like. At the same time as signaling a throughput increase, or shortly thereafter, a recovery wait timer is initiated. The process then moves to step 614, where the RoT levels are monitored to detect the presence of a potential RoT spike that may have been produced due to the throughput increase and/or change in the interference level from other interference sources. The monitoring of the RoT levels in step 614 may start substantially immediately after signaling the throughput increase (e.g., within a duration of a subframe). In step 618, the determination is made as to whether or not an RoT spike is present. If an RoT spike is detected, the process moves to step 606, where a reduction in the UE throughput is signaled. If, in step 618, no RoT spikes are observed, it is determined, in step 620, if the recovery wait timer has expired. Upon expiration of the recovery wait timer, the process returns to step 602, otherwise the process moves back to step 614, where the monitoring of the RoT is continued.

The process that is described in the exemplary flow diagram of FIG. 6 can be carried out, at least in-part, by each node in a wireless communication system. For example, each node in the wireless communication system may perform the steps that are described in FIG. 6 independently from other nodes in the wireless communication system. In some embodiments, however, the steps that are described in FIG. 6 may be conducted collaboratively between two or more nodes in the wireless communication system.

The disclosed embodiments facilitate in-cell power control in situations where at least one UE (e.g., a HSUPA UE that is served by the cell) is connected to the cell. In such scenarios, modifications to the UE's throughput (e.g., grant level) are signaled to the UE and the RoT is measured when it is applied by the UE. However, the disclosed embodiments are also applicable to situations where no UEs (e.g., no HSUPA UEs that are served by the cell) are currently connected to the cell. For instance, if there is a non-zero RoT even in the absence of any HSUPA UEs, then an incoming HSUPA UE can be instructed to transmit at a grant value that is lower than the nominal grant value to prevent an RoT spike. It should be noted that the RoT computations are based on a measure of the total received power at the cell, which is compared with a known constant noise floor. This measurement is typically computed by the AGC block that can be configured to be always in operation irrespective of how many UEs or what type of UEs are connected to the cell. As noted earlier, the nominal grant values are selected to produce a target RoT (e.g., 7 dB) while assuming there is no interference from non-HSUPA UEs. A non-zero RoT when no UEs are connected to the cell is likely indicative of non-HSUPA UEs, UEs that are not controlled by the current cell and/or UEs are in the vicinity of the current cell (as noted earlier, to simplify the nomenclature, these entities may be referred to as "uncontrolled" entities). The disclosed embodiments enable the detection of the RoT attributable to such uncontrolled UEs, and therefore, modify the grant value accordingly for one or more UEs that are served by the current cell.

In the example scenario, where a single high grant and a number of minimum-grants are allocated to the UEs of a given cell in a TDM-like fashion, a single nominal high grant value (i.e., the high grant value allocated assuming no uncontrolled UEs are connected) is allocated that is common for all UEs. The disclosed embodiments enable modifications to the single nominal grant value for the cell. For example, once the scheduler modifies the high grant value for a UE that is currently utilizing high grant, the same modified high grant value is reassigned to a new UE that is added to the cell. However, according to some embodiments, different UEs in a cell may be allocated different high grant values. Such a scenario can arise if a UE in soft handoff is a strong interferer at the non-serving cell and the UE is issued an ns-RGCH command by the non-serving cell to lower its grant. The serving cell of the interfering UE can infer such a situation and determine the lower grant value to be signaled to the interfering UE to prevent it from interfering with other cells. In this situation, two choices for a lower grant value for the interfering UE is available: a lower grant value that is produced in response to the ns-RGCH command, and a lower grant that is produced pursuant to the RoT monitoring (e.g., according to the process that is described in FIG. 6). Any of the two grants, or combinations thereof (e.g., an average value) may be signaled to the UE. In one particular example, the lower of the two grants is signaled to the UE.

The above-noted embodiments enable control of grant allocations based on live (or on-going) RoT measurements. In other embodiments, a multi-tier power control mechanism is implemented. The first tier can include a fast inner loop, through which one or more short-term statistics based on RoT measurements are computed over a short duration. For example, short-term statistics can be computed using RoT measurements anywhere from a few subframes (e.g., few tens of milliseconds) up to several seconds (e.g., 10 seconds). Some examples of the short-term RoT statistics include, but are not limited to, mean RoT, maximum RoT, minimum RoT, and the like. The short-term computed statistics are then compared with known target values to assess whether an RoT spike or RoT underrun is present. In one example, a short-term statistic is computed as the average of three consecutive RoT measurements, which is then compared with a target of 7 dB.

A second tier can include a slow outer loop, through which one or more long-term statistics based on RoT measurements are computed over a much longer duration. For example, long-term statistics may be computed using RoT measurements over several hundreds or thousands of subframes. Some examples of the long-term RoT statistics include, but are not limited to, median RoT, 1% tail RoT, and the like. In some embodiments, the computed long-term statistics are different from the computed short-term statistics. For example, a computed short term statistic can be an average RoT while a long-term statistic can be a 1% tail RoT value. The targets used in the fast inner loop can then be modified by comparing the computed long-term statistics with preset thresholds.

In one embodiment, an average RoT is used as the short-term statistic in the fast loop while self-tuning to a 1% tail RoT is used in the slow outer loop. The fast loop maintains the average RoT close to an RoT target (e.g., 7 dB). However, depending on system dynamics, using only the fast loop statistics can result in a 1% tail probability on the RoT distribution that is widely varying. To illustrate this dependency on system dynamics, it is instructive to note that HSUPA can operate using a transmission time interval (TTI) of 2 ms and 10 ms. The 2 ms TTI is only supported by some HSUPA UEs but allows for rapid adaptation of transmission parameters and reduces the end-user delays. In this context, the RoT spikes can be quelled much more effectively when all UEs are transmitting with a 2 ms TTI compared to the scenario where the UEs communicate with 10 ms TTIs. As a result, with 2 ms TTIs a higher RoT target can be specified while still producing a 1% tail probability statistic that is comparable to the case where all users utilize 10 ms TTIs with an original RoT target. One method of improving system capacity, therefore, is to add a slow outer loop that computes the 1% tail RoT and compares the computed value against another preset threshold, say 14 dB. If the computed 1% tail RoT is lower than the preset threshold, then the target value for the fast inner loop statistic i.e., average RoT can be increased, for example, from 7 dB to 8 dB. The overall impact is that a higher system capacity can be attained without impacting link stability in certain circumstances by considering factors such as location of the users, types of connections, TTI lengths, number of cells, and the like.

Figure 7:
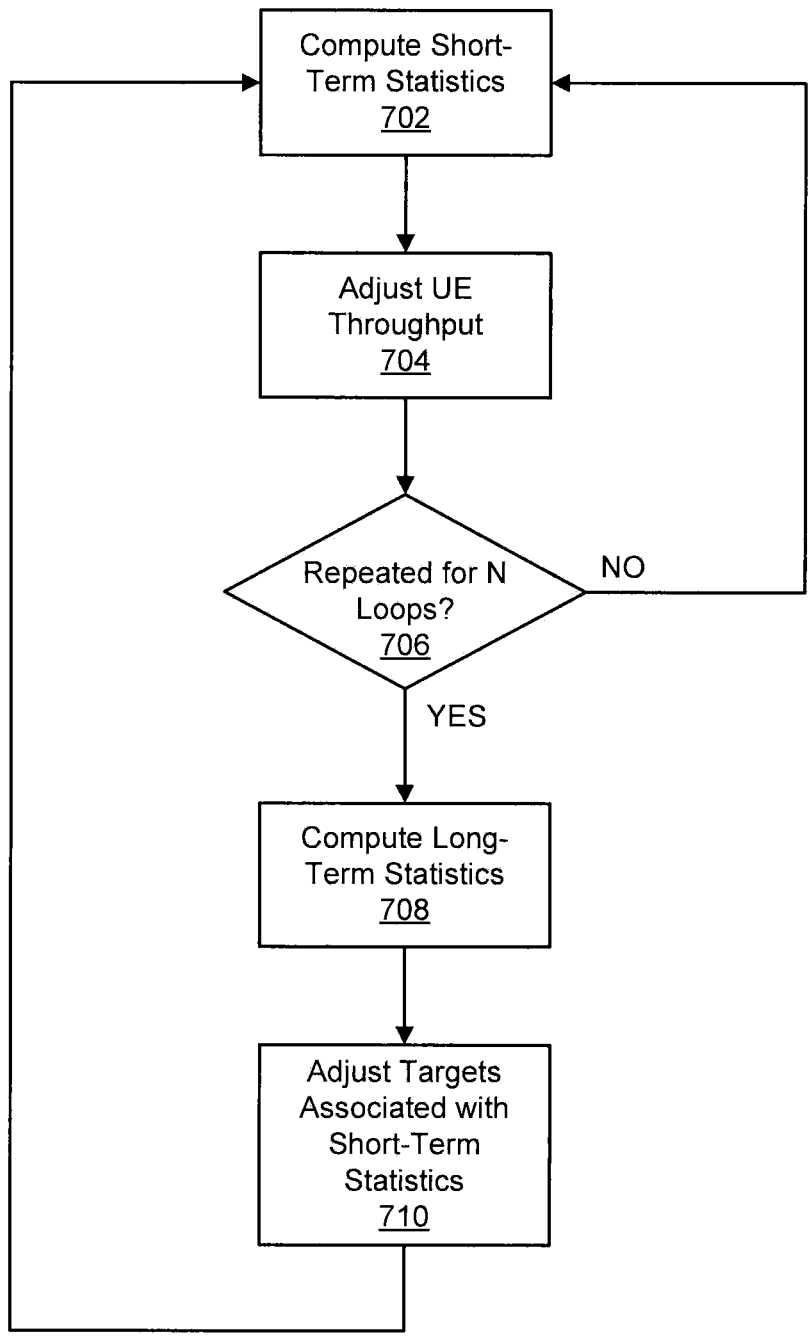
FIG. 7 illustrates a block diagram illustrating operations associated with a multi-tier resource grant control in accordance with an example embodiment.

FIG. 7 is a block diagram that illustrates the operations that are conducted as part of the above-described multi-tier power control mechanism. In step 702, one or more short-term (i.e., tier-1) statistics are computed. For example, an average RoT over three consecutive subframe measurements can be used as a short term statistic. In step 704, the throughput of the UE is adjusted (if necessary) based on the computed short-term statistics. This adjustment can be carried out using the exemplary steps that were described in connection with FIG. 6. In step 706, it is determined if the computation of the short-term statistic and adjustment of the UE throughput (if needed) were carried out for a particular number (i.e., N) of times. For example, N can be selected to correspond to a particular duration of time, such as a few seconds. If the answer is NO, the process returns to step 702. Otherwise, the process continues to step 708, where a long-term (i.e., tier-2) statistic is computed. For example, a long-term statistic such as the 1% RoT tail can be computed in step 708. In step 710, the target values that are used for comparing the computed short-term statistics are modified, if necessary, based on the computed long-term statistics. At the completion of step 710, the process returns to step 702, where the computations of short-term statistics are repeated. It should be noted that while the block diagram of FIG. 7 depicts only a two-tier mechanism for dynamically monitoring and modifying the RoT characteristics, the disclosed embodiments can be extended to apply to mechanisms with more than two tiers.

Figure 8:
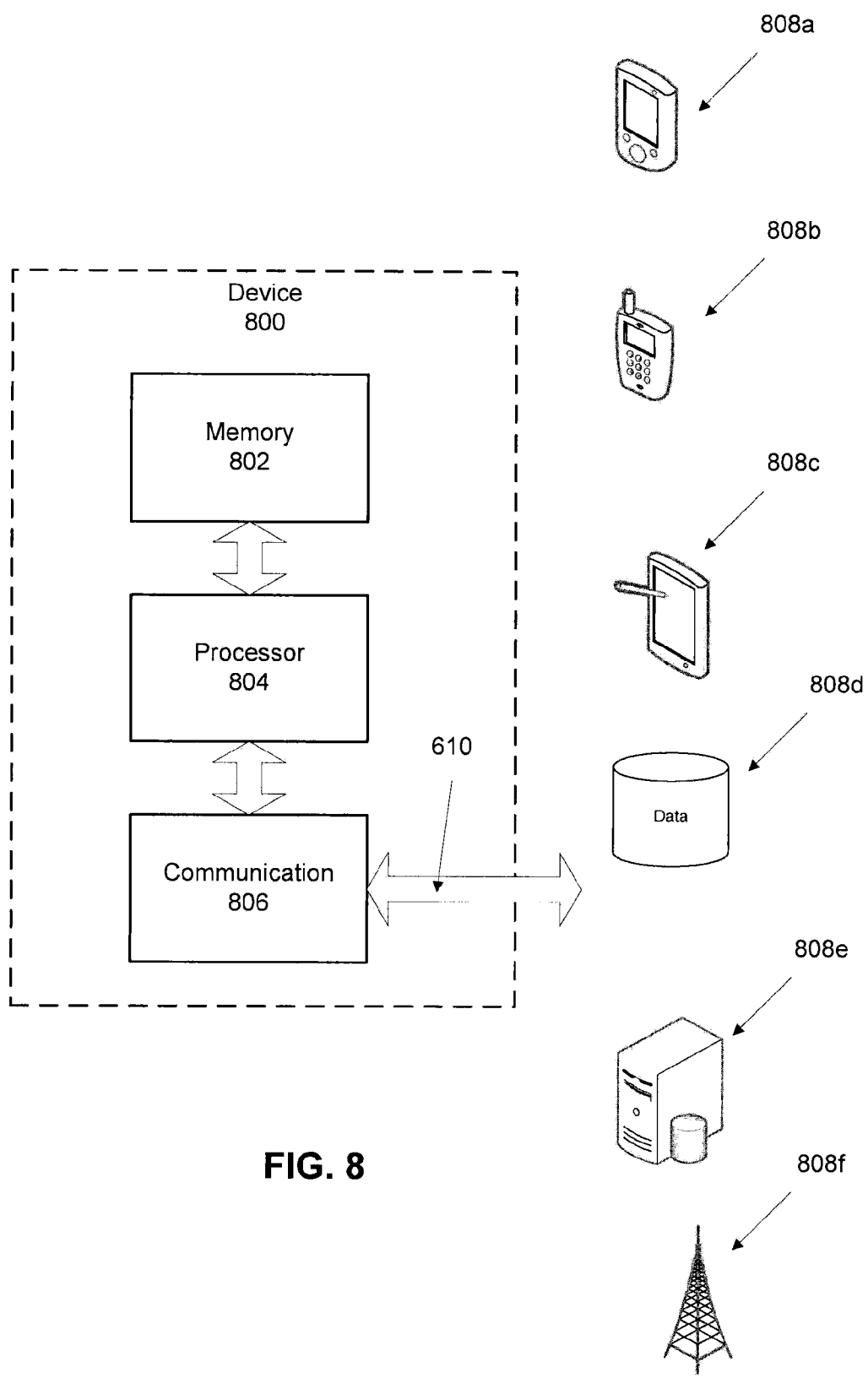
FIG. 8 illustrates a block diagram of an example device for implementing the various disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 8 illustrates a block diagram of a device 800 within which the various embodiments of the present invention may be implemented. The device 800 comprises at least one processor 802 and/or controller, at least one memory 804 unit that is in communication with the processor 802, and at least one communication unit 806 that enables the exchange of data and information, directly or indirectly, with other entities, devices and networks 808*a* to 808*f*. For example, the device 800 may be in communication with mobile devices 808*a*, 808*b*, 808*c*, with a database 808*d*, a sever 808*e* and a radio node 808*f*. The communication unit 806 may provide wired and/or wireless communication capabilities, through communication link 610, in accordance with one or more communication protocols and, therefore, it may comprise the proper transmitter/receiver antennas, circuitry and ports, as well as the encoding/decoding capabilities that may be necessary for proper transmission and/or reception of data and other information. The exemplary device 800 that is depicted in FIG. 8 may be integrated as part of the various entities that are depicted in FIGS. 1-3, including an access controller 114, an access point 101, 102, 104, 106, 108 and 112, a radio node controller 204a and 204b, a Node B 206a and 206b, a user equipment 208a, 208b and 208c, a services node 304, a radio node 306a, 306b and 306c, and/or an operator 308. The device 800 that is depicted in FIG. 8 may reside as a separate component within or outside the above-noted entities that are depicted in FIGS. 1-3.

Similarly, the various components or sub-components within each module of the present invention may be implemented in software, hardware, firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the disclosed embodiments can be implemented as computer program products that reside on a non-transitory computer-readable medium. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. For example, the disclosed embodiments are equally applicable to networks that utilize different communication technologies, including but not limited to UMTS (including R99 and all high-speed packet access (HSPA) variants), as well as LTE, WiMAX, GSM and the like. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   estimating interference values at a node in a wireless communication network in the presence of one or more interfering entities that are not controlled by the node in the wireless communication network; and
   producing one or more signals indicative of a modified throughput associated with transmissions of one or more user equipments controlled by the node in the wireless communication network in accordance with the estimated interference values; wherein:
   the interference values are rise over thermal (RoT) values, and the one or more signals are produced at each node in the wireless communication network;
   the estimated RoT values are used to determine at least one RoT statistic; and
   the signal is produced if the at least one determined RoT statistic fails to conform to a corresponding target statistic.

2. The method of claim 1, wherein each node operates independently from other nodes in the wireless communication network.

3. The method of claim 1, wherein at least one node operates collaboratively with at least one other node in the wireless communication network.

4. The method of claim 1, wherein the one or more interfering entities that are not controlled by the node are selected from a group consisting of:
   a non-high-speed-uplink-data-access (non-HSUPA) entity;
   an entity that is controlled by a neighboring cell;
   an entity that is not controlled by an uplink scheduler of the node; and
   an entity that is controlled by another wireless communication network.

5. The method of claim 1, wherein
   the at least one determined RoT statistic exceeds a target RoT level; and
   the signal is indicative of a reduced throughput associated with transmissions of one or more user equipment controlled by the node, and
   the level of reduced throughput indicated is dynamically adjustable.

6. The method of claim 1, wherein
   the at least one determined RoT statistic is below a target RoT level; and
   the signal is indicative of an increased throughput associated with transmissions of one or more user equipment controlled by the node and
   the level of increased throughput indicated is dynamically adjustable.

7. The method of claim 1, wherein a second determination of an RoT statistic is made after a particular period of time subsequent to the determination of the at least one RoT statistic.

8. The method of claim 7, wherein the particular period of time is selected in accordance with parameters associated with the user equipment and/or the wireless communication network, and wherein the particular period of time is updatable to account for changes in network configuration and other system parameters.

9. The method of claim 8, wherein the parameters are selected from a group consisting
   of some or all of:
   a speed of decoding of the signal by the user equipment;
   a speed of effecting the modified throughput by the user equipment;

a duration of information units associated with the wireless communication network; and a delay associated with the transmission of the signal.

10. The method of claim 1, wherein:

the signal is transmitted to the user equipment; and a second determination of an RoT level is made substantially immediately after transmission of the signal.

11. The method of claim 1, wherein the signal is indicative of a modified allocated power grant level associated with the user equipment.

12. The method of claim 1, wherein:

the user equipment is connected to the wireless communication network; and the signal is transmitted to the user equipment.

13. The method of claim 1, wherein:

the at least one determined RoT statistic is a short-term statistic.

14. The method of claim 1, wherein:

the at least one determined RoT statistic is a long-term statistic; and a target RoT level associated with a short-term statistic is modified in accordance with the determined long-term statistic.

15. The method of claim 1, further comprising:

propagating the estimated interference values to other processes on the network that are responsible for managing the transmissions from the one or more user equipments controlled by the node in the wireless network.

16. A method comprising:

estimating interference values at a node in a wireless communication network in the presence of one or more interfering entities that are not controlled by the node in the wireless communication network; and producing one or more signals indicative of a modified throughput associated with transmissions of one or more user equipments controlled by the node in the wireless communication network in accordance with the estimated interference values, wherein:

the user equipment is not connected to the wireless communication network; and the signal is transmitted to the user equipment once the user equipment is connected to the wireless communication network.

17. A device, comprising a processor; and a memory comprising processor executable code, the processor executable code, when executed by the processor, configures the device to:

estimate interference values at a node in a wireless communication network in the presence of one or more interfering entities that are not controlled by the node in the wireless communication network; and produce one or more signals indicative of a modified throughput associated with transmissions of one or more user equipments controlled by the node in the wireless communication network in accordance with the interference values, wherein:

the one or more user equipments are not connected to the wireless communication network; and the processor executable code, when executed by the processor, configures the device to transmit the one or more signals to the one or more user equipments once the one or more user equipments are connected to the wireless communication network.

18. The device of claim 17, wherein the interference values are rise over thermal (RoT) values, and wherein the one or more signals are produced at each node in the wireless communication network.

19. The device of claim 17, wherein each node operates independently from other nodes in the wireless communication network.

20. The device of claim 17, wherein the one or more interfering entities that are not controlled by the node are selected from a group consisting of:

a non-high-speed-uplink-data-access (non-HSUPA) entity;

an entity that is controlled by a neighboring cell;

an entity that is not controlled by an uplink scheduler of the node; and an entity that is controlled by another wireless communication network.

21. The device of claim 17, wherein the one or more signals are indicative of a modified allocated power grant level associated with the one or more user equipments.

22. The device of claim 17, wherein the processor executable code, when executed by the processor, configures the device to operate collaboratively with at least one other node in the wireless communication network.

23. A device, comprising a processor; and a memory comprising processor executable code, the processor executable code, when executed by the processor, configures the device to:

estimate interference values at a node in a wireless communication network in the presence of one or more interfering entities that are not controlled by the node in the wireless communication network; and produce one or more signals indicative of a modified throughput associated with transmissions of one or more user equipments controlled by the node in the wireless communication network in accordance with the interference values, wherein the interference values are Rise over Thermal (RoT) values, and wherein the one or more signals are produced at each node in the wireless communication network and wherein the processor executable code, when executed by the processor, configures the device to:

determine at least one RoT statistic using the estimated RoT values; and produce the one or more signals if the at least one determined RoT statistic fails to conform to a corresponding target statistic.

24. The device of claim 23, wherein the at least one determined RoT statistic exceeds a target RoT level; and the one or more signals are indicative of a reduced throughput associated with transmissions of the one or more user equipments controlled by the node.

25. The device of claim 23, wherein the at least one determined RoT statistic is below a target RoT level; and the one or more signals are indicative of an increased throughput associated with transmissions of one or more user equipments controlled by the node.

26. The device of claim 23, wherein the processor executable code, when executed by the processor, configures the device to carry out a second determination of an RoT statistic after a particular period of time subsequent to the determination of the at least one RoT statistic.

27. The device of claim 26, wherein the particular period of time is selected in accordance with parameters associated with the one or more user equipments and/or the wireless communication network.

28. The device of claim 27, wherein the parameters are selected from a group consisting of some or all of:
- a speed of decoding of the one or more signals by the one or more user equipments;
- a speed of effecting the modified throughput by the one or more user equipments;
- a duration of information units associated with the wireless communication network; and
- a delay associated with the transmission of the signal.

29. The device of claim 23, wherein the processor executable code, when executed by the
processor, configures the device to:
- transmit the one or more signals to the one or more user equipments; and
- carry out a second determination of an RoT level substantially immediately after transmission of the one or more signals.

30. The device of claim 23, wherein:
- the one or more user equipments are connected to the wireless communication network; and
- the processor executable code, when executed by the processor, configures the device to transmit the one or more signals to the one or more user equipments.

31. The device of claim 23, wherein:
- the at least one determined RoT statistic is a short-term statistic.

32. The device of claim 23, wherein:
- the at least one determined RoT statistic is a long-term statistic; and
- the processor executable code, when executed by the processor, configures the device to modify a target RoT level associated with a short-term statistic in accordance with the determined long-term statistic.

33. A computer program product, embodied on a non-transitory computer readable medium, comprising:
- program code for estimating interference values at a node in a wireless communication network in the presence of one or more interfering entities that are not controlled by the node in the wireless communication network; and
- program code for producing one or more signals indicative of a modified throughput associated with transmissions of one or more user equipments controlled by the node in the wireless communication network in accordance with the estimated interference values, wherein:
  - the user equipment is not connected to the wireless communication network; and
  - the signal is transmitted to the user equipment once the user equipment is connected to the wireless communication network.

34. The computer program product embodied on a non-transitory computer readable medium according to claim 33, wherein the interference values are rise over thermal (RoT) values, and wherein the one or more signals are produced at each node in the wireless communication network.

35. A method comprising:
- connecting a user equipment to a wireless communication network;
- subsequent to connecting the user equipment to the wireless communication network, receiving at least one signal indicative of a modified throughput associated with transmissions of the user equipment controlled by the wireless communication network, the signal having been produced when the user equipment is not connected to the wireless communication network by estimating interference values at a node associated with the wireless communication network in the presence of one or more interfering entities that are not controlled by the node in the wireless communication network; and
- effecting the modified throughput at the user equipment.

36. The method according to claim 35, wherein the interference values are rise over thermal (RoT) values, and wherein the at least one signal is produced at each node in the wireless communication network.

37. A device, comprising
a processor; and
a memory comprising processor executable code, the processor executable code, when executed by the processor, configures the device to:
- connect to a wireless communication network;
- subsequent to connecting to the wireless communication network, receive at least one signal indicative of a modified throughput associated with transmissions of the device controlled by the wireless communication network, the at least one signal having been produced when the device is not connected to the wireless communication network by estimating interference values at a node associated with the wireless communication network in the presence of one or more interfering entities that are not controlled by the node in the wireless communication network; and
- effect the modified throughput at the device.

38. The device according to claim 37, wherein the interference values are rise over thermal (RoT) values, and wherein the at least one signal is produced at each node in the wireless communication network.

39. A computer program product, embodied on a non-transitory computer readable medium, comprising:
- program code for connecting a user equipment to a wireless communication network;
- program code for receiving, subsequent to connecting the user equipment to the wireless communication network, at least one signal indicative of a modified throughput associated with transmissions of the user equipment controlled by the wireless communication network, the at least one signal having been produced when the user equipment is not connected to the wireless communication network by estimating interference values at a node associated with the wireless communication network in the presence of one or more interfering entities that are not controlled by the node in the wireless communication network; and
- program code for effecting the modified throughput at the user equipment.

40. The computer program product embodied on a non-transitory computer readable medium according to claim 39, wherein the interference values are rise over thermal (RoT) values, and wherein the one or more signals are produced at each node in the wireless communication network.

* * * * *